(12) United States Patent
Kirichenko et al.

(10) Patent No.: US 11,977,458 B2
(45) Date of Patent: May 7, 2024

(54) SYSTEM AND METHOD FOR STORAGE AWARENESS SERVICE FAILOVER

(71) Applicant: EMC IP Holding Company, LLC, Hopkinton, MA (US)

(72) Inventors: Evgeniy Kirichenko, Saint Petersburg (RU); Sergey Alexeev, Saint Petersburg (RU); Yakov Belikov, Saint Petersburg (RU); Alexey Shusharin, Saint Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/722,512

(22) Filed: Apr. 18, 2022

(65) Prior Publication Data

US 2023/0126331 A1   Apr. 27, 2023

(51) Int. Cl.
*G06F 11/14* (2006.01)
*G06F 11/07* (2006.01)
*H04L 67/1097* (2022.01)
*H04L 67/146* (2022.01)

(52) U.S. Cl.
CPC ...... *G06F 11/1469* (2013.01); *G06F 11/0772* (2013.01); *G06F 11/1464* (2013.01); *G06F 11/1484* (2013.01); *H04L 67/1097* (2013.01); *H04L 67/146* (2013.01)

(58) Field of Classification Search
CPC ............ G06F 11/1469; G06F 11/0772; G06F 11/1464; H04L 67/146
USPC ........................................................ 714/6.3
See application file for complete search history.

(56) References Cited

U.S. PATENT DOCUMENTS 10,678,576 B1 *   6/2020   Taylor ................... G06F 16/119
2014/0085480 A1 *   3/2014   Saptharishi ......  H04N 21/23113
                                                  348/159

* cited by examiner

*Primary Examiner* — Yair Leibovich
(74) *Attorney, Agent, or Firm* — Brian J. Colandreo; Heath M. Sargeant; Holland & Knight LLP

(57) ABSTRACT

A method, computer program product, and computing system for determining whether a storage awareness service provider node of a storage system has failed. In response to determining that the storage awareness service provider node has failed, an intermediate storage awareness service may be deployed within the storage system. At least one request may be processed on the storage system via the intermediate storage awareness service.

20 Claims, 6 Drawing Sheets

SYSTEM AND METHOD FOR STORAGE AWARENESS SERVICE FAILOVER

TECHNICAL FIELD

This disclosure relates to deploying virtualized storage systems and, more particularly, to minimizing delays during storage awareness service failover within the virtualized storage system.

BACKGROUND

Storing and safeguarding electronic content is of paramount importance in modern business. Accordingly, various methodologies may be employed to protect and distribute such electronic content. Many modern storage systems are configured to support virtualized storage components (i.e., virtual storage appliances, virtual machines, etc.). In order to manage storage components (as well as monitoring their status) various storage awareness services are used. The availability of such storage awareness services defines the overall availability the storage system for its clients. While conventional failover processes may eventually recover the functionality of the storage awareness service, periods of time without storage awareness services may be prolonged by predefined status reporting constraints associated with particular vendors.

SUMMARY OF DISCLOSURE

In one implementation, a computer-implemented method is executed on a computing system including, but is not limited to, determining whether a storage awareness service provider node of a storage system has failed. In response to determining that the storage awareness service provider node has failed, an intermediate storage awareness service may be deployed within the storage system. At least one request may be processed on the storage system via the intermediate storage awareness service.

One or more of the following features may be included. The storage awareness service may be VMware API for Storage Awareness (VASA). Processing, via the intermediate storage awareness service, at least one request on the storage system includes determining whether the at least one request is one of: a request with an unknown session identifier; a getEvents request; a getAlarms request; and a setContext request. In response to determining that the at least one request is a request with an unknown session identifier, the intermediate storage awareness service may provide an invalid session response for the unknown session identifier. In response to determining that the at least one request is one of a getEvents request and a getAlarms request, the intermediate storage awareness service may provide an empty response to the request. In response to determining that the at least one request is a setContext request, the intermediate storage awareness service may provide a new session identifier. In response to determining that the at least one request is not one of a getEvents request, a getAlarms request, or a setContext request, the intermediate storage awareness service may provide a busy response to the at least one request. The storage awareness service provider node may be recovered on another node of the storage system, thus defining a new storage awareness service provider node. Processing of the at least one request may be switched from the intermediate storage awareness service to the new storage awareness service provider node.

In another implementation, a computer program product resides on a computer readable medium and has a plurality of instructions stored on it. When executed by a processor, the instructions cause the processor to perform operations including, but not limited to, determining whether a storage awareness service provider node of a storage system has failed. In response to determining that the storage awareness service provider node has failed, an intermediate storage awareness service may be deployed within the storage system. At least one request may be processed on the storage system via the intermediate storage awareness service.

One or more of the following features may be included. The storage awareness service may be VMware API for Storage Awareness (VASA). Processing, via the intermediate storage awareness service, at least one request on the storage system includes determining whether the at least one request is one of: a request with an unknown session identifier; a getEvents request; a getAlarms request; and a setContext request. In response to determining that the at least one request is a request with an unknown session identifier, the intermediate storage awareness service may provide an invalid session response for the unknown session identifier. In response to determining that the at least one request is one of a getEvents request and a getAlarms request, the intermediate storage awareness service may provide an empty response to the request. In response to determining that the at least one request is a setContext request, the intermediate storage awareness service may provide a new session identifier. In response to determining that the at least one request is not one of a getEvents request, a getAlarms request, or a setContext request, the intermediate storage awareness service may provide a busy response to the at least one request. The storage awareness service provider node may be recovered on another node of the storage system, thus defining a new storage awareness service provider node. Processing of the at least one request may be switched from the intermediate storage awareness service to the new storage awareness service provider node.

In another implementation, a computing system includes a processor and a memory system configured to perform operations including, but is not limited to, determining whether a storage awareness service provider node of a storage system has failed. In response to determining that the storage awareness service provider node has failed, an intermediate storage awareness service may be deployed within the storage system. At least one request may be processed on the storage system via the intermediate storage awareness service.

One or more of the following features may be included. The storage awareness service may be VMware API for Storage Awareness (VASA). Processing, via the intermediate storage awareness service, at least one request on the storage system includes determining whether the at least one request is one of: a request with an unknown session identifier; a getEvents request; a getAlarms request; and a setContext request. In response to determining that the at least one request is a request with an unknown session identifier, the intermediate storage awareness service may provide an invalid session response for the unknown session identifier. In response to determining that the at least one request is one of a getEvents request and a getAlarms request, the intermediate storage awareness service may provide an empty response to the request. In response to determining that the at least one request is a setContext request, the intermediate storage awareness service may provide a new session identifier. In response to determining that the at least one request is not one of a getEvents request, a getAlarms request, or a setContext request, the intermediate storage awareness service may provide a busy response to the at least one request. The storage awareness service provider node may be recovered on another node of the storage system, thus defining a new storage awareness service provider node. Processing of the at least one request may be switched from the intermediate storage awareness service to the new storage awareness service provider node.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
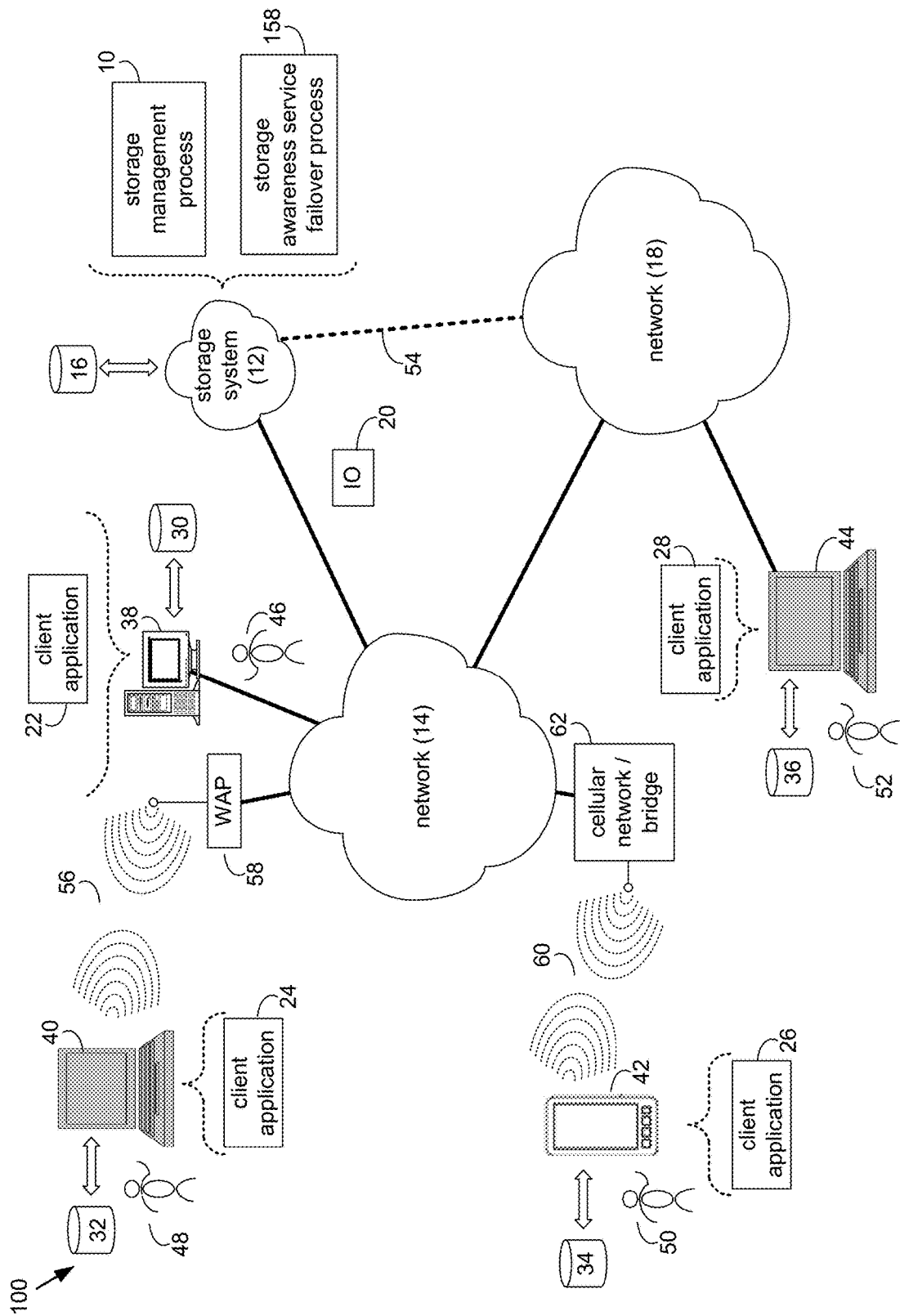
FIG. 1 is a diagrammatic view of a storage system, a storage awareness service failover process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
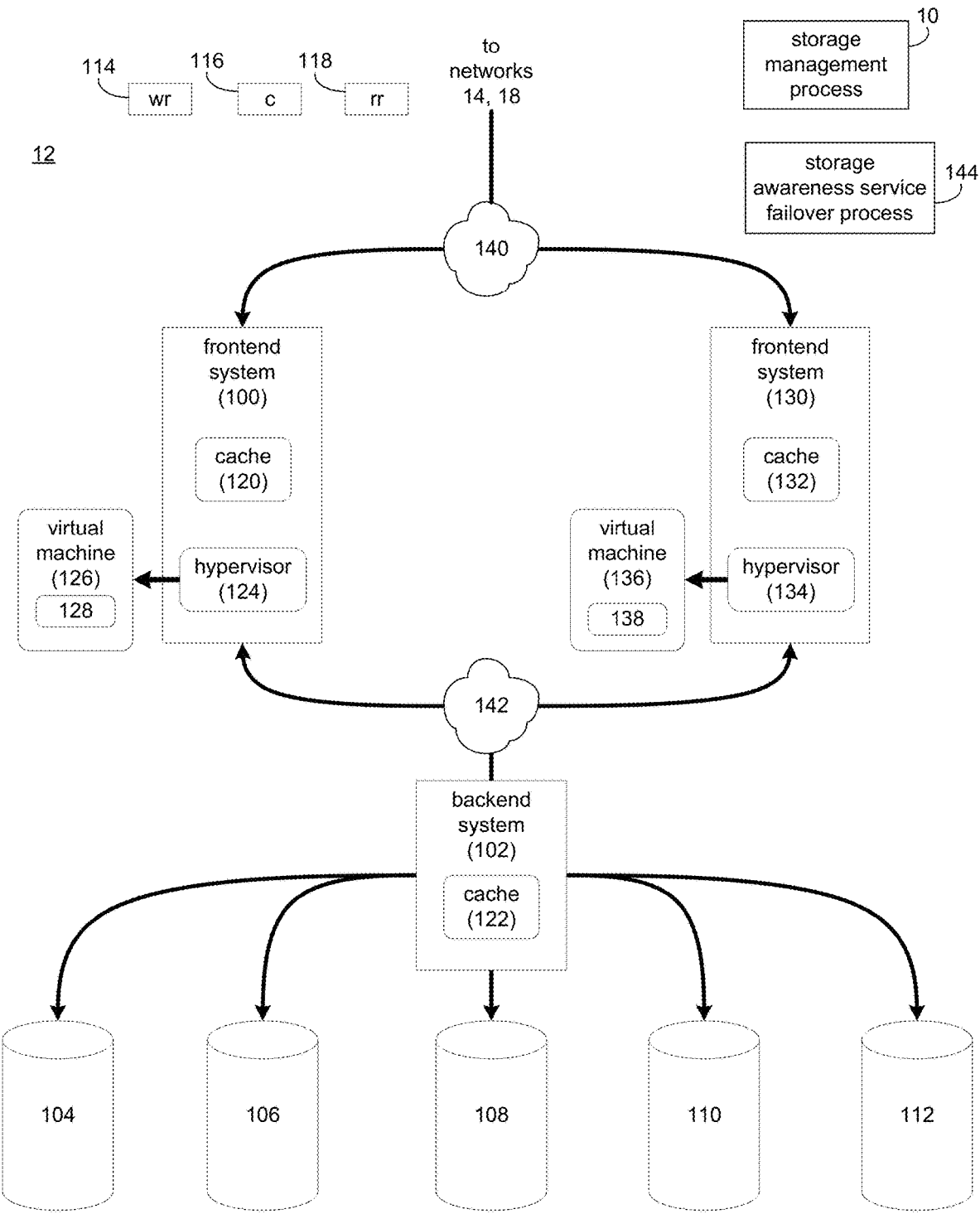
FIG. 2 is a diagrammatic view of the storage system of FIG. 1 according to one or more embodiments of the present disclosure.
Figure 3:
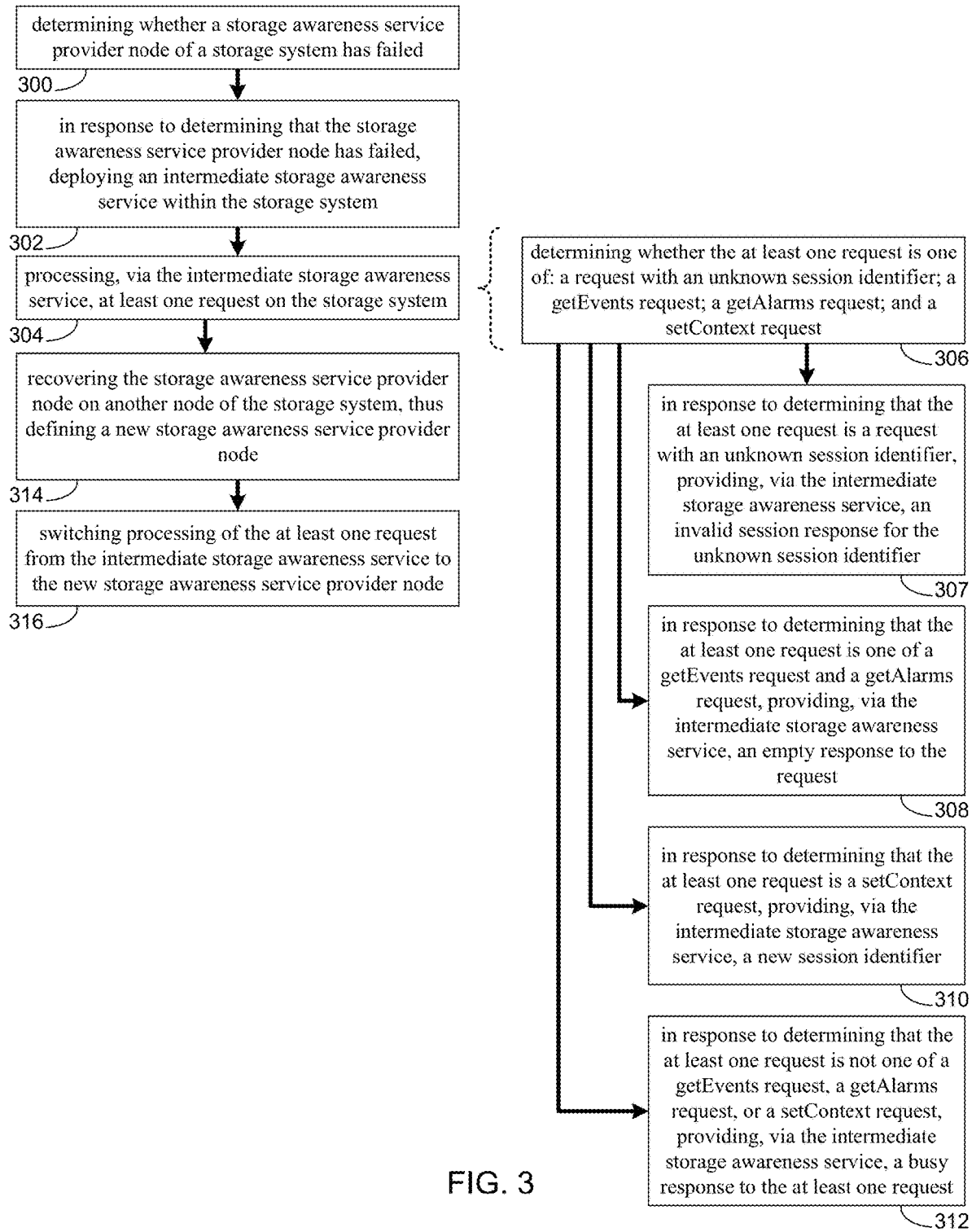
FIG. 3 is a flow chart of the storage awareness service failover process of FIG. 1 according to one or more embodiments of the present disclosure.

Storage System:

Referring also to FIG. 2, there is shown a general and illustrative implementation of storage system 12 (or a portion thereof). In this general and illustrative implementation, data storage system 12 may include frontend system 100, backend system 102 and a plurality of storage targets (e.g. storage targets 104, 106, 108, 110, 112). Storage targets 104, 106, 108, 110, 112 may be configured to provide various levels of performance and/or high availability. For example, one or more of storage targets 104, 106, 108, 110, 112 may be configured as a RAID 0 array, in which data is striped across storage targets. By striping data across a plurality of storage targets, improved performance may be realized. However, RAID 0 arrays do not provide a level of high availability. Accordingly, one or more of storage targets 104, 106, 108, 110, 112 may be configured as a RAID 1 array, in which data is mirrored between storage targets. By mirroring data between storage targets, a level of high availability is achieved as multiple copies of the data are stored within storage system 12.

While storage targets 104, 106, 108, 110, 112 are discussed above as being configured in a RAID 0 or RAID 1 array, this is for illustrative purposes only and is not intended to be a limitation of this disclosure, as other configurations are possible. For example, storage targets 104, 106, 108, 110, 112 may be configured as a RAID 3, RAID 4, RAID 5, RAID 6 or RAID 7 array. Additionally, storage targets 104, 106, 108, 110, 112 need not be limited to any type of RAID systems, as other configurations are possible and are considered to be within the scope of this disclosure. For example, storage targets 104, 106, 108, 110, 112 may be configured as e.g., scale-out SANs (such as VMWare vSAN™ and Dell EMC Scale IO™).

While in this particular example, storage system 12 is shown to include five storage targets (e.g. storage targets 104, 106, 108, 110, 112), this is for illustrative purposes only and is not intended to be a limitation of this disclosure. Specifically, the actual number of storage targets may be increased or decreased depending upon e.g. the level of redundancy/performance/capacity required.

One or more of storage targets 104, 106, 108, 110, 112 may be configured to store coded data, wherein such coded data may allow for the regeneration of data lost/corrupted on one or more of storage targets 104, 106, 108, 110, 112. Examples of such coded data may include but is not limited to parity data and Reed-Solomon data. Such coded data may be distributed across all of storage targets 104, 106, 108, 110, 112 or may be stored within a specific storage device. Examples of storage targets 104, 106, 108, 110, 112 may include one or more electro-mechanical hard disk drives and/or solid-state/flash devices.

Storage system 12 may execute all or a portion of storage management process 10. The instruction sets and subroutines of storage management process 10, which may be stored on a storage device (e.g., storage device 16) coupled to frontend system 100 and/or backend system 102, may be executed by one or more processors (not shown) and one or more memory architectures (not shown) included within frontend system 100 and/or backend system 102. Storage device 16 may include but is not limited to: a hard disk drive; a RAID device; random access memory (RAM); read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 114 (i.e. a request that content 116 be written to storage system 12) and data read request 118 (i.e. a request that content 116 be read from storage system 12).

During operation of frontend system 100, content 116 to be written to storage system 12 may be processed by frontend system 100. Additionally/alternatively and when frontend system 100 is configured as an application server, content 116 to be written to storage system 12 may be internally generated by frontend system 100.

Frontend system 100 may include frontend cache memory system 120. Examples of frontend cache memory system 120 may include but are not limited to a volatile, solid-state, cache memory system (e.g., a dynamic RAM cache memory system) and/or a non-volatile, solid-state, cache memory system (e.g., a flash-based, cache memory system).

Frontend system 100 may initially store content 116 within frontend cache memory system 120. Depending upon the manner in which frontend cache memory system 120 is configured, frontend system 100 may immediately provide content 116 to backend system 102 (if frontend cache memory system 120 is configured as a write-through cache) or may subsequently provide content 116 to backend system 102 (if frontend cache memory system 120 is configured as a write-back cache).

Backend system 102 may include backend cache memory system 122. Examples of backend cache memory system 122 may include but are not limited to a volatile, solid-state, cache memory system (e.g., a dynamic RAM cache memory system) and/or a non-volatile, solid-state, cache memory system (e.g., a flash-based, cache memory system). During operation of backend system 102, content 116 to be written to storage targets 104, 106, 108, 110, 112 may be received from frontend system 100. Backend system 112 may initially store content 116 within backend cache memory system 122 prior to being stored on e.g. one or more of storage targets 104, 106, 108, 110, 112.

Frontend system 100 may include and/or execute a hypervisor (e.g., hypervisor 124) that may allow for the execution of one or more virtual machines (e.g., virtual machine 126). As is known in the art, a hypervisor (e.g., hypervisor 124) is a piece of computer software, firmware and/or hardware that creates and runs virtual machines (e.g., virtual machine 126). The hypervisor (e.g., hypervisor 124) may present and manage a guest operating system on a virtual operating platform. Therefore, multiple instantiations of a variety of operating systems may be effectuated on shared hardware resources. For example, Linux™, Windows™, and Mac™ operating system instantiations may all run on a single physical x86 system. In some implementations, frontend system 100 may be a Dell EMC PowerStore infrastructure platform developed by Dell EMC of Hopkinton, Massachusetts. In one example, PowerStore may provide a storage system with VMware vSphere built-in. As is known in the art, vSphere is a virtualization storage platform. In one example, frontend system 100 may include or deploy a VMware ESXi™ hypervisor developed by VMware, Inc. of Palo Alto, California. As is known in the art, ESXi is an enterprise-class, type-1 hypervisor developed by VMware for deploying and serving virtual machines. In this manner, frontend system 100 may be referred to as an ESXi host. However, while examples have been provided of an ESXi and other virtualization products from VMware, it will be appreciated that these are for example purposes only and that any type of virtualization components may be used within the scope of the present disclosure.

Accordingly, virtual machine 126 may be an emulation of a physical computer system. For example, virtual machine 126 may be configured to provide the functionality of a Windows™ based computing system and may allow for the execution of Windows-based application 128, while another virtual machine may be configured to provide the functionality of a Linux™ based computing system and may allow for the execution of a Linux-based application. While hypervisor 124 is shown with one virtual machine (e.g., virtual machine 126), it will be appreciated that hypervisor 124 may create and run any number of virtual machines within the scope of the present disclosure.

Frontend system 100 and/or backend system 102 may include one or more physical hardware components (not shown) that may be configurable by hypervisor 124 to form virtual machines (e.g., virtual machines 126). Examples of these physical hardware components may include but are not limited to: hard drives (e.g., storage targets 104, 106, 108, 110, 112), RAID arrays (e.g., formed by storage targets 104, 106, 108, 110, 112), host bus adapters, network controllers, network systems and components, processor cores, cache memory architectures (e.g., frontend cache memory system 120 and/or backend cache memory system 122), volatile memory architectures, and persistent memory architectures. Accordingly and when virtual machine 126 is executed on hypervisor 124, various portions of these physical hardware components may be assigned to/mapped to virtual machine 126.

In order to provide a higher-level of availability and/or a higher level of performance, storage system 12 may include additional frontend systems (e.g., frontend system 130) that may be configured in a manner similar to frontend system 100. Therefore, frontend system 130 may include a frontend cache system (e.g., frontend cache 132) and may include and/or execute a hypervisor (e.g., hypervisor 134) that may allow for the execution of one or more virtual machines (e.g., virtual machine 136), which may run applications (e.g., application 138). While an example with two frontend systems has been described above, it will be appreciated that any number of frontend systems may be used within the scope of the present disclosure.

The various components of storage system 12 may be interconnected with (and may communicate through) one or more communication networks (e.g., networks 140, 142).

Storage Awareness Service (SAS) Failover Process:

The instruction sets and subroutines of storage awareness service (SAS) failover process 144, which may be stored on a storage device (e.g., storage device 16) coupled to frontend system 100, frontend system 130, and/or backend system 102, may be executed by one or more processors (not shown) and one or more memory architectures (not shown) included within frontend system 100, frontend system 130, and/or backend system 102.

Referring also to FIGS. 2-6 and in some embodiments, SAS failover process 144 may determine 300 whether a storage awareness service provider node of a storage system has failed. In response to determining that the storage awareness service provider node has failed, an intermediate storage awareness service may be deployed 302 within the storage system. At least one request may be processed 304 on the storage system via the intermediate storage awareness service.

Implementations of the present disclosure may generally allow for minimal delays in storage awareness service (SAS) failover from one storage node to another. For example and as discussed above, many modern storage systems are configured to support virtualized storage components (i.e., virtual storage appliances, virtual machines, etc.). In order to manage storage components (as well as monitoring their status) various storage awareness services are used. The availability of such storage awareness services defines the overall availability the storage system for its clients. While conventional failover processes may eventually recover the functionality of the storage awareness service, periods of time without storage awareness services may be prolonged by predefined status reporting constraints associated with particular vendors. SAS failover process 144 may provide limited functionality via an intermediate storage awareness service to process storage awareness requests while full storage awareness services are restored. In this manner, SAS failover process 144 may minimize failover downtime when a storage awareness service provider is unavailable.

Figure 4:
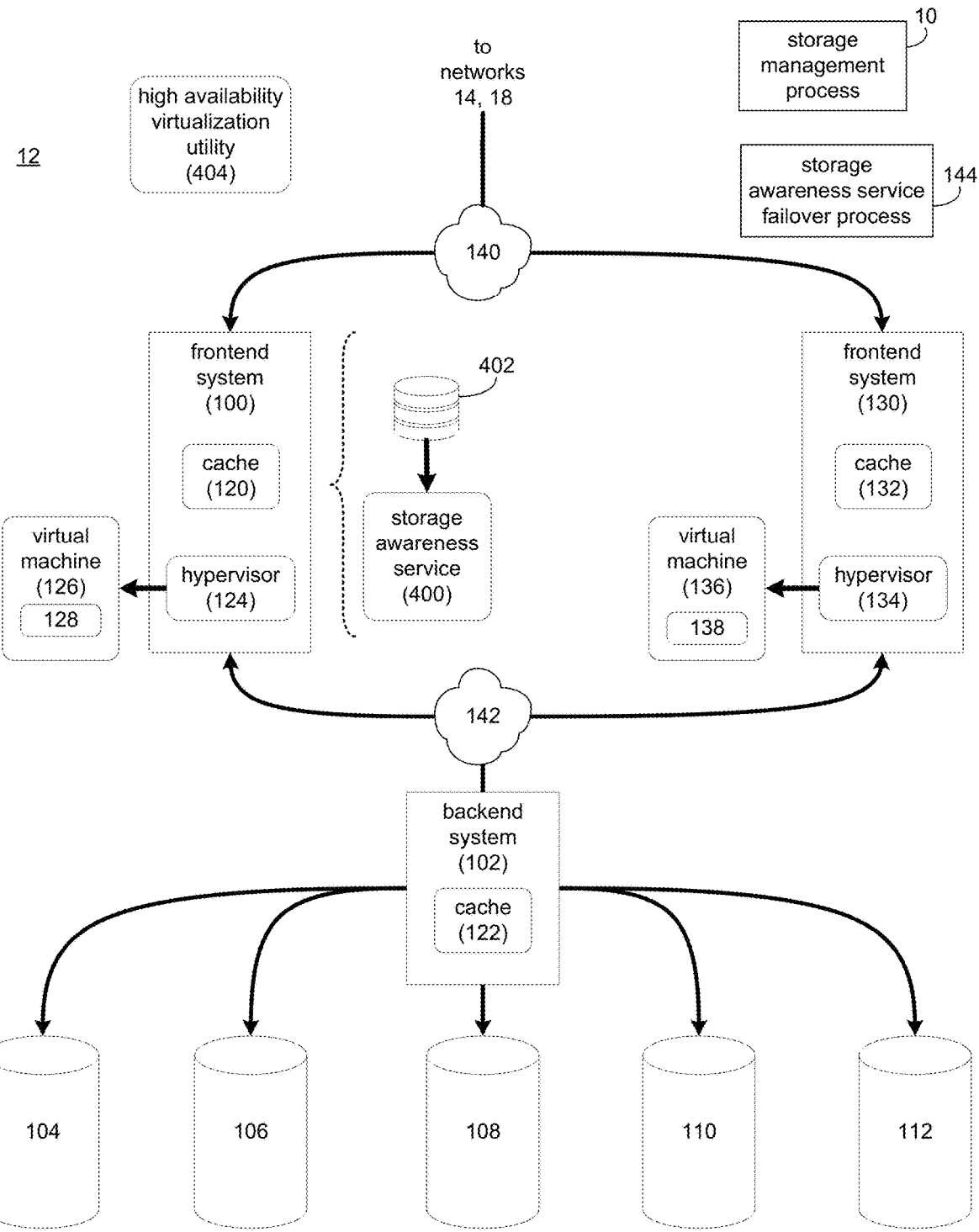
FIGS. 4-6 are diagrammatic views of the storage awareness service failover process of FIG. 1 according to one or more embodiments of the present disclosure.

In some implementations, SAS failover process 144 may determine 300 whether a storage awareness service provider node of a storage system has failed. Referring also to FIG. 4 and as discussed above, a virtualized storage system may include one or more storage nodes (e.g., frontend systems 100, 130) with one or more hypervisors (e.g., hypervisors 124, 134). The one or more hypervisors may include ESXi hypervisors. In this manner, each of the storage nodes (e.g., frontend systems 100, 130) may be referred to as ESXi hosts configured to deploy one or more virtual machines (e.g., virtual machines 126, 136). In one example, the virtualized storage system may be configured as a VMware vSphere virtualization platform. As is known in the art, the vSphere virtualization platform includes one or more ESXi hosts configured to deploy and manage a plurality of virtual machines.

Referring also to FIG. 4 and in some implementations, the virtualized storage system (e.g., storage system 12) may include a storage awareness service (e.g., storage awareness service 400) configured to manage the virtualized storage components within the virtualized storage system. The storage awareness service (e.g., storage awareness service 400) may be deployed on a storage node (e.g., frontend system 100). Accordingly, a storage node (e.g., frontend system 100) configured to deploy a storage awareness service (e.g., storage awareness service 400) may be referred to as a storage awareness service provider node within the scope of the present disclosure. As shown in the example of FIG. 4 where storage awareness service 400 is deployed on frontend system 100, frontend system 100 may be referred to as a storage awareness service provider node.

In some implementations, the storage awareness service (e.g., storage awareness service 400) may include, but is not limited to, the VMware API for Storage Awareness (VASA). For example and as discussed above, the virtualized storage system may include the VMware vSphere virtualization storage platform. As is known in the art, VASA is a software component that acts as a storage awareness service for the vSphere virtualization storage platform. In this manner, a storage node (e.g., frontend system 100) configured to deploy a storage awareness service (e.g., storage awareness service 400) may be referred to as a VASA provider within the scope of the present disclosure. In one example, the VASA services of a VASA provider may be a part of the storage system management stack (e.g., storage system management stack 402) of a storage node (e.g., frontend system 100). While the example of VASA has been provided for the storage awareness service, it will be appreciated that other types of storage awareness services may be used within the scope of the present disclosure.

In some implementations, SAS failover process 144 may provide storage awareness services (e.g., storage awareness service 400) to a high availability (HA) virtualization utility (e.g., HA virtualization utility 404). The high availability virtualization utility (e.g., HA virtualization utility 404) may be configured to monitor storage nodes and virtual machines to detect hardware and guest operating system failures; restart virtual machines on other storage nodes without manual intervention when a storage node outage is detected; and reduce application downtime by automatically restarting virtual machines upon detection of an operating system failure. In one example, the high availability virtualization utility (e.g., HA virtualization utility 404) may be VMware vSphere HA. However, it will be appreciated that other high availability virtualization utilities may be used within the scope of the present disclosure.

In some implementations, the high availability virtualization utility (e.g., HA virtualization utility 404) may be configured to determine when a storage node has failed. The HA virtualization utility (e.g., HA virtualization utility 404) may include various predefined timeout periods between successful commands or requests on the storage system to indicate a storage node failure. For example, the state of a storage awareness service provider node (e.g., a VASA provider) may defined by a e.g., 60 second timeout from the last successful command. When the e.g., 60 second timer expires, the VASA provider state may be redefined as unhealthy. In addition, the high availability virtualization utility (e.g., HA virtualization utility 404) may include a failover timeout in response to identifying a storage node failure. In one example, suppose at least 60 seconds passes after the last successful command or request, the HA virtualization utility (e.g., HA virtualization utility 404) may determine that the storage awareness service provider node has failed. Accordingly, the HA virtualization utility (e.g., HA virtualization utility 404) may wait e.g., 120 seconds based on a predefined timeout period before determining whether a new storage awareness service provider node is operational.

Using these example values, conventional failover approaches may require at least e.g., 180 seconds before the HA virtualization utility (e.g., HA virtualization utility 404) determines that the storage awareness service is recovered on another node. In one example, availability of a storage awareness service provider (e.g., a VASA provider) may be required (e.g., for vSphere failover) to run a virtual volume-based failover process. As such, SAS failover process 144 may provide or deploy 302 an intermediate storage awareness service provider to prevent the HA virtualization utility (e.g., HA virtualization utility 404) from determining that the storage awareness service provider node has failed. In this manner, SAS failover process 144 may avoid the predefined, unchangeable timeout periods of the HA virtualization utility (e.g., HA virtualization utility 404) from further delaying storage awareness service failover.

Returning again to the example of FIG. 4, suppose that a storage node (e.g., frontend system 100) is running with a storage system management stack (e.g., storage system management stack 402) that includes a storage awareness service (e.g., storage awareness service 400). In this example, frontend system 100 may be referred to as a storage awareness service provider node as frontend system 100 is providing storage awareness service 400. Suppose that frontend system 100 becomes unavailable (e.g., in response to a loss of power, a failure within frontend system 100, and/or a request to shut down frontend system 100). In this example, SAS failover process 144 may utilize various monitoring services and/or systems to determine that frontend system 100 has failed (e.g., become unavailable).

Figure 5:
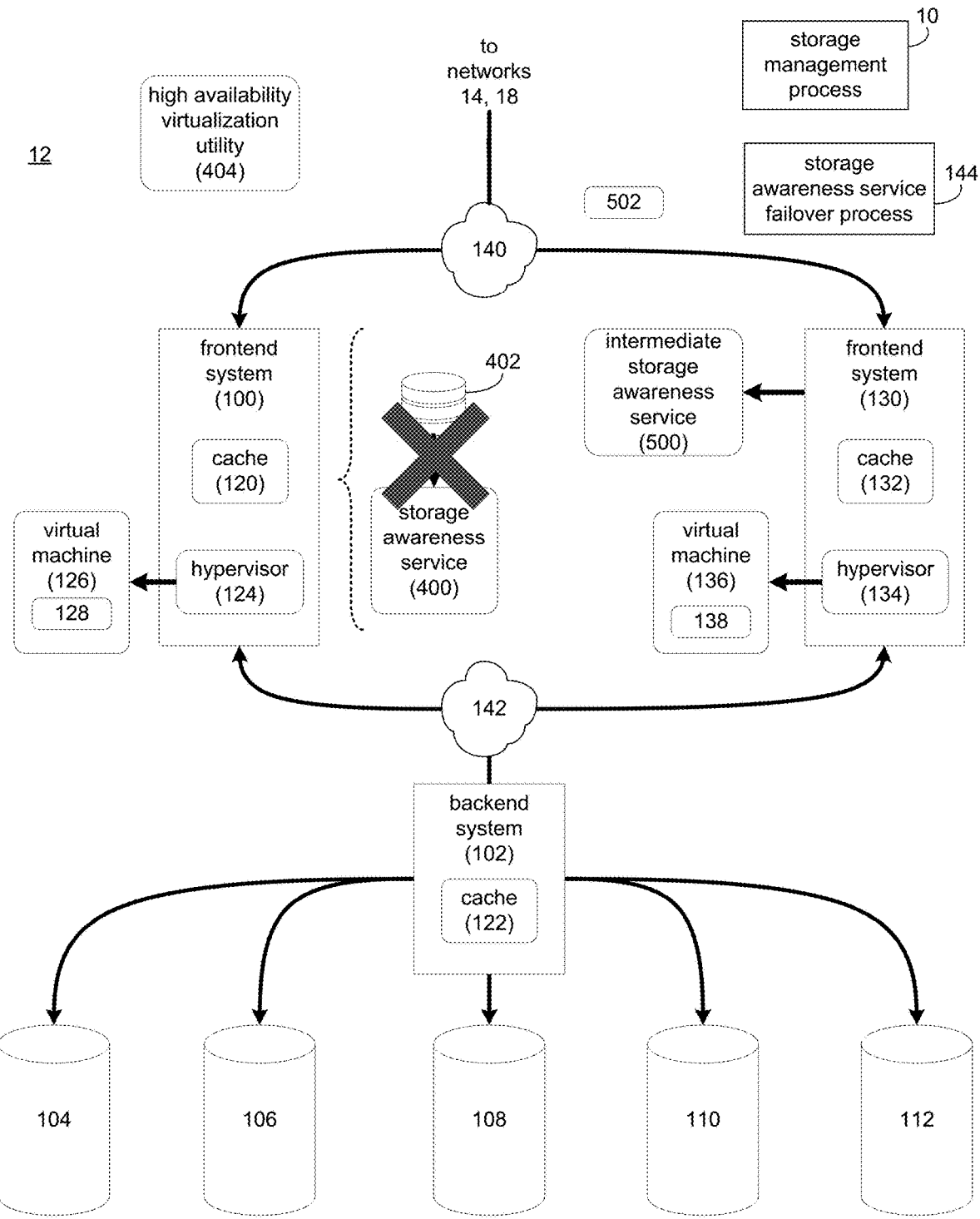

In some implementations, SAS failover process 144 may, in response to determining 300 that the storage awareness service provider node has failed, deploy 302 an intermediate storage awareness service within the storage system. Referring also to FIG. 5, suppose SAS failover process 144 determines 300 whether a storage awareness service provider node of a storage system has failed (e.g., as indicated by the red "X" over storage awareness service 400 and storage system management stack 402). In this example, SAS failover process 144 may deploy 302 an intermediate storage awareness service within the storage system. An intermediate storage awareness service (e.g., intermediate storage awareness service 500) may generally include a limited instantiation of storage awareness service 400 that is configured to perform a subset of the functions of storage awareness service. The intermediate storage awareness service (e.g., intermediate storage awareness service 500) may be configured to provide the minimal protocol-required functionality to make the associated client(s) consider storage components to be available. Deploying 302 the intermediate storage awareness service (e.g., intermediate storage awareness service 500) may include deploying the intermediate storage awareness service (e.g., intermediate storage awareness service 500) via another node of the storage system (e.g., frontend system 130) and/or via a separate computing device within the storage system. In this manner, the intermediate storage awareness service (e.g., intermediate storage awareness service 500) may be configured to initialize quickly to process requests from various virtual machines and/or from the high availability virtualization utility (e.g., HA virtualization utility 404).

In some implementations, SAS failover process 144 may process 304, via the intermediate storage awareness service, at least one request on the storage system. For example and as discussed above, when deploying various virtual machines (e.g., virtual machine 126) on a functioning storage node (e.g., frontend system 100), the storage node may generate and/or relay requests from the virtual machines deployed on the storage node to the storage awareness service also deployed on that storage node. In addition to requests from "within" the storage node, SAS failover process 144 may process 304, via the storage awareness service (e.g., storage awareness service 400) on the storage awareness service provider node (e.g., frontend system 100), requests (e.g., request 502) from various virtual machines on various storage nodes and/or the HA virtualization utility (e.g., HA virtualization utility 404). However, when the storage awareness service provider node (e.g., frontend system 100) is determined 300 to have failed, requests (e.g., request 502) from virtual machines and/or the HA virtualization utility (e.g., HA virtualization utility 404) may be processed 304 using the intermediate storage awareness service (e.g., intermediate storage awareness service 500).

Processing 304, via the intermediate storage awareness service, at least one request on the storage system may include determining 306 whether the at least one request is one of a request with an unknown session identifier; getEvents request; a getAlarms request; and a setContext request. For example, suppose storage awareness service 400 is VASA. In this example, the at least one request (e.g., request 502) may include a request to obtain an event (e.g., getEvents as defined for VASA); a request to obtain an alarm (e.g., getAlarms as defined for VASA); and/or a request to set the session context (e.g., setContext as defined for VASA). While three specific types of request have been described, it will be appreciated that other types of requests may have specific types of required responses within the scope of the present disclosure. Accordingly, SAS failover process 144 may provide specific responses, via the intermediate storage awareness service (e.g., intermediate storage awareness service 500), for specific types of requests (e.g., a getEvents request, a getAlarms request, and/or a setContext request). In this manner, SAS failover process 144 may determine 306 the request type and provide a particular type of response to that determined request in order to avoid having a HA virtualization utility (e.g., HA virtualization utility 404) determine that the storage awareness service provider node is unhealthy and extending the failover recovery time of the virtualized storage system.

In response to determining 306 that the at least one request is a request with an unknown session identifier, SAS failover process 144 may provide 307, via the intermediate storage awareness service, an invalid session response for the unknown session identifier. For example, when a client (e.g., an ESXi host, a HA virtualization utility, and/or another computing device) sends a request to the virtualized storage system, the request may include a session identifier specific to a particular storage awareness service provider (e.g., a VASA provider). In response to the storage awareness service provider node (e.g., frontend system 100) no longer being available, the previous session identifier may be unknown to the intermediate storage awareness service (e.g., intermediate storage awareness service 500). Accordingly, SAS failover process 144 may provide 307, via the intermediate storage awareness service, an invalid session response for the unknown session identifier. As will be discussed in greater detail below, when an invalid session response is returned to the client, the client may attempt to initiate a new session by sending a setContext request.

In some implementations and in response to determining 306 that the at least one request is one of a getEvents request and a getAlarms request, SAS failover process 144 may provide 308, via the intermediate storage awareness service, an empty response to the at least one request. For example, suppose the request (e.g., request 502) is a getEvents request. As is known in the art, a getEvents request causes the storage awareness service provider to respond with any event information since the previous request. Accordingly, and to avoid causing the HA virtualization utility (e.g., HA virtualization utility 404) to determine that the storage awareness service provider node is unhealthy and extending the failover recovery time of the virtualized storage system, SAS failover process 144 may provide 308, via the intermediate storage awareness service, an empty response to the getEvents request. In this manner, the HA virtualization utility (e.g., HA virtualization utility 404) may not timeout and further delay the failover recovery time of the virtualized storage system.

Suppose that the request (e.g., request 502) is a getEvents request. As is known in the art, a getAlarms request causes the storage awareness service provider to respond with any alarm information since the previous request. Accordingly, and to avoid causing the HA virtualization utility (e.g., HA virtualization utility 404) to determine that the storage awareness service provider node is unhealthy and extending the failover recovery time of the virtualized storage system, SAS failover process 144 may provide 308, via the intermediate storage awareness service, an empty response to the getAlarms request. In this manner, the HA virtualization utility (e.g., HA virtualization utility 404) may not timeout and further delay the failover recovery time of the virtualized storage system.

In some implementations and in response to determining 306 that the at least one request is a setContext request, SAS failover process 144 may provide 310, via the intermediate storage awareness service, a new session identifier. For example, suppose that the request (e.g., request 502) is a setContext request. As is known in the art, a setContext request causes the storage awareness service provider to respond with a new session identifier. For example, when a client (e.g., an ESXi host, a HA virtualization utility, and/or another computing device) sends a request to the virtualized storage system, the request may include a session identifier specific to a particular storage awareness service provider (e.g., a VASA provider). As discussed above and in response to the storage awareness service provider node (e.g., frontend system 100) no longer being available, the previous session identifier may be unknown to the intermediate storage awareness service (e.g., intermediate storage awareness service 500).

Accordingly, when SAS failover process 144 determines 306 that the at least one request (e.g., request 502) is a setContext request, SAS failover process 144 may provide 310, via the intermediate storage awareness service (e.g., intermediate storage awareness service 500), a new session identifier. For example, SAS failover process 144 may provide a new session identifier to initiate a new session between the requesting device (e.g., an ESXi host, a HA virtualization utility, and/or another computing device) and the intermediate storage awareness service (e.g., intermediate storage awareness service 500). In this manner, the HA virtualization utility (e.g., HA virtualization utility 404) may not timeout and further delay the failover recovery time of the virtualized storage system.

In some implementations and in response to determining 306 that the at least one request is not one of a getEvents request, a getAlarms request, or a setContext request, SAS failover process 144 may provide 312, via the intermediate storage awareness service, a busy response to the at least one request. For example, for other requests (e.g., other than a getEvents request, a getAlarms request, and/or a setContext request), SAS failover process 144 may provide 312, via the intermediate storage awareness service (e.g., intermediate storage awareness service 500) a busy response to the at least one request (e.g., request 502). In one example, suppose the storage awareness service (e.g., storage awareness service 400) is VASA. In this example, SAS failover process 144 may provide 312, via the intermediate storage awareness service (e.g., intermediate storage awareness service 500) a "VASA BUSY" response. Accordingly, SAS failover process 144 may provide 312 busy responses to ensure that the HA virtualization utility (e.g., HA virtualization utility 404) does not timeout and further delay the failover recovery time of the virtualized storage system.

Figure 6:
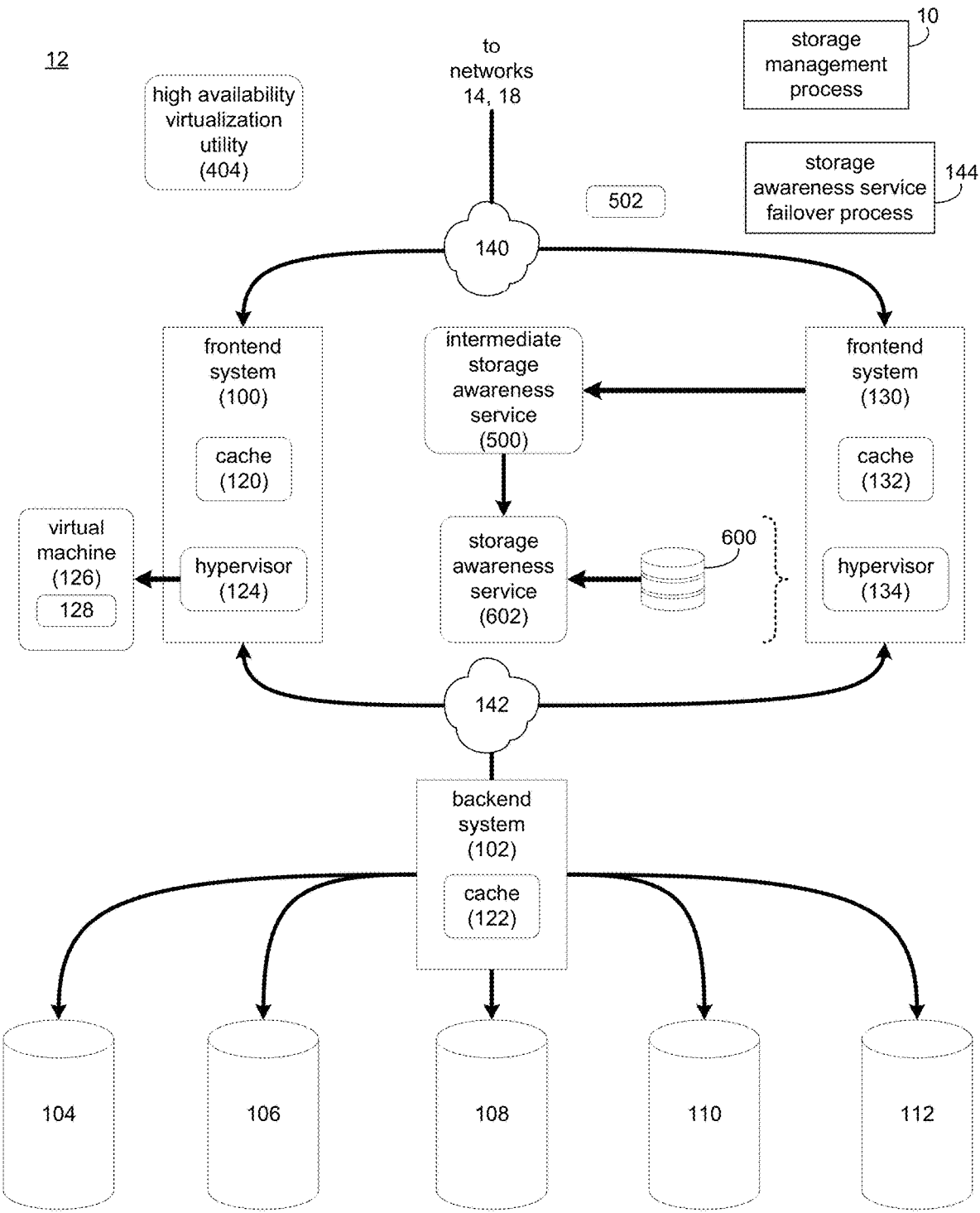

In some implementations, SAS failover process 144 may recover 314 the storage awareness service provider node on another node of the storage system, thus defining a new storage awareness service provider node. Referring also to FIG. 6, SAS failover process 144 may failover the storage system stack (e.g., storage system stack 600) from the failed storage awareness service provider node (e.g., frontend system 100) to another node (e.g., frontend system 130), thus defining a new storage awareness service provider node (e.g., with storage system stack 600 and storage awareness services 602 operating on frontend system 130).

In some implementations, SAS failover process 144 may switch 316 processing of the at least one request from the intermediate storage awareness service to the new storage awareness service provider node. For example, SAS failover process 144 may switch 316 processing of requests from the intermediate storage awareness service (e.g., intermediate storage awareness service 500) to the new storage awareness provider node (e.g., frontend system 130 with storage awareness service 602) when the new storage awareness provider node (e.g., frontend system 130 with storage awareness service 306) is ready to handle incoming requests.

To avoid the timeout issues associated with the high availability virtualization utility (e.g., HA virtualization utility 404), switching 316 processing of the at least one request from the intermediate storage awareness service to the new storage awareness service provider node may include providing a new session identifier as requested (e.g., in response to a setContext request). In this manner, no data may be shared between the intermediate storage awareness service (e.g., intermediate storage awareness service 500) and the new storage awareness service (e.g., storage awareness service 602). In response to switching 316 processing of the at least one request from the intermediate storage awareness service (e.g., intermediate storage awareness service 500) to the new storage awareness service provider node (e.g., frontend system 130 with storage awareness service 602), SAS failover process 144 may deactivate or otherwise disable the intermediate storage awareness service (e.g., intermediate storage awareness service 500).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    determining whether a storage awareness service provider node of a storage system has failed;
    in response to determining that the storage awareness service provider node has failed, deploying an intermediate storage awareness service within the storage system; and
    processing, via the intermediate storage awareness service, at least one request on the storage system.

2. The computer-implemented method of claim 1, wherein the storage awareness service is VMware API for Storage Awareness (VASA).

3. The computer-implemented method of claim 2, wherein processing, via the intermediate storage awareness service, at least one request on the storage system includes:
    determining whether the at least one request is one of:
        a request with an unknown session identifier;
        a getEvents request;
        a getAlarms request; and
        a setContext request.

4. The computer-implemented method of claim 3, further comprising one or more of:
    in response to determining that the at least one request is a request with the unknown session identifier, providing, via the intermediate storage awareness service, an invalid session response for the unknown session identifier; and
    in response to determining that the at least one request is one of a getEvents request and a getAlarms request, providing, via the intermediate storage awareness service, an empty response to the at least one request.

5. The computer-implemented method of claim 3, further comprising:
    in response to determining that the at least one request is a setContext request, providing, via the intermediate storage awareness service, a new session identifier.

6. The computer-implemented method of claim 3, further comprising:
    in response to determining that the at least one request is not one of a getEvents request, a getAlarms request, or a setContext request, providing, via the intermediate storage awareness service, a busy response to the at least one request.

7. The computer-implemented method of claim 1, further comprising:
    recovering the storage awareness service provider node on another node of the storage system, thus defining a new storage awareness service provider node; and
    switching processing of the at least one request from the intermediate storage awareness service to the new storage awareness service provider node.

8. A computer program product comprising a non-transitory computer readable medium having a plurality of instructions stored thereon which, when executed by a processor, cause the processor to perform operations comprising:
    determining whether a storage awareness service provider node of a storage system has failed;
    in response to determining that the storage awareness service provider node has failed, deploying an intermediate storage awareness service within the storage system; and
    processing, via the intermediate storage awareness service, at least one request on the storage system.

9. The computer program product of claim 8, wherein the storage awareness service is VMware API for Storage Awareness (VASA).

10. The computer program product of claim 9, wherein processing, via the intermediate storage awareness service, at least one request on the storage system includes:
    determining whether the at least one request is one of:
        a request with an unknown session identifier;
        a getEvents request;
        a getAlarms request; and
        a setContext request.

11. The computer program product of claim 10, wherein the operations further comprise one or more of:
    in response to determining that the at least one request is a request with the unknown session identifier, providing, via the intermediate storage awareness service, an invalid session response for the unknown session identifier; and
    in response to determining that the at least one request is one of a getEvents request and a getAlarms request, providing, via the intermediate storage awareness service, an empty response to the at least one request.

12. The computer program product of claim 10, wherein the operations further comprise:
    in response to determining that the at least one request is a setContext request, providing, via the intermediate storage awareness service, a new session identifier.

13. The computer program product of claim 10, wherein the operations further comprise:
    in response to determining that the at least one request is not one of a getEvents request, a getAlarms request, or a setContext request, providing, via the intermediate storage awareness service, a busy response to the at least one request.

14. The computer program product of claim 8, wherein the operations further comprise:
    recovering the storage awareness service provider node on another node of the storage system, thus defining a new storage awareness service provider node; and switching processing of the at least one request from the intermediate storage awareness service to the new storage awareness service provider node.

15. A computing system comprising:
    a memory; and
    a processor configured to determine whether a storage awareness service provider node of a storage system has failed, wherein the processor is further configured to deploy an intermediate storage awareness service within the storage system in response to determining that the storage awareness service provider node has failed, and wherein the processor is further configured to process, via the intermediate storage awareness service, at least one request on the storage system.

16. The computing system of claim 15, wherein the storage awareness service is VMware API for Storage Awareness (VASA).

17. The computing system of claim 16, wherein processing, via the intermediate storage awareness service, at least one request on the storage system includes:
    determining whether the at least one request is one of:
        a request with an unknown session identifier;
        a getEvents request;
        a getAlarms request; and
        a setContext request.

18. The computing system of claim 17, wherein the processor is further configured to one or more of:
    in response to determining that the at least one request is a request with the unknown session identifier, provide, via the intermediate storage awareness service, an invalid session response for the unknown session identifier; and:
    in response to determining that the at least one request is one of a getEvents request and a getAlarms request, provide, via the intermediate storage awareness service, an empty response to the at least one request.

19. The computing system of claim 17, wherein the processor is further configured to:
    in response to determining that the at least one request is a setContext request, provide, via the intermediate storage awareness service, a new session identifier.

20. The computing system of claim 17, wherein the processor is further configured to:
    in response to determining that the at least one request is not one of a getEvents request, a getAlarms request, or a setContext request, provide, via the intermediate storage awareness service, a busy response to the at least one request.

* * * * *

UNITED STATES PATENT AND TRADEMARK OFFICE
CERTIFICATE OF CORRECTION

| | | |
|---|---|---|
| PATENT NO. | : 11,977,458 B2 | Page 1 of 1 |
| APPLICATION NO. | : 17/722512 | |
| DATED | : May 7, 2024 | |
| INVENTOR(S) | : Evgeniy Kirichenko et al. | |

It is certified that error appears in the above-identified patent and that said Letters Patent is hereby corrected as shown below:

On the Title Page

Item (30) Foreign Application Priority Data should be corrected to read as follows:
October 21, 2021 (RU) 2021130628

Signed and Sealed this
Second Day of September, 2025

Coke Morgan Stewart
*Acting Director of the United States Patent and Trademark Office*